United States Patent Office 3,413,371
Patented Nov. 26, 1968

3,413,371
AROMATIC HYDROGENATION PROCESS
Norman A. Fishel, Lansing, Mich., assignor to Universal Oil Products Company, Des Plaines, Ill., a corporation of Delaware
No Drawing. Filed June 30, 1967, Ser. No. 650,229
10 Claims. (Cl. 260—667)

ABSTRACT OF THE DISCLOSURE

An aromatic compound is hydrogenated utilizing a catalyst comprising a crystalline aluminosilicate chemically combined with a metal subfluoride vapor.

---

This invention relates to a conversion process for the hydrogenation of an aromatic compound into more useful compounds. More specifically, this invention is concerned with a conversion process for the hydrogenation of an aromatic compound utilizing a novel catalyst comprising a crystalline aluminosilicate containing at least one metal from Group VIII of the Periodic Table chemically combined with a metal subfluoride vapor.

It is an object of this invention to provide a process for the hydrogenation of aromatic compounds utilizing a novel hydrogenation catalyst.

A specific object of this invention is to provide a novel method and a novel catalyst for hydrogenating aromatic compounds to provide the desired hydrogenated product in high yields without the inducing of other decomposition reactions.

One embodiment of the invention relates to a conversion process which comprises hydrogenating an aromatic compound at a temperature in the range of from about 10° to about 425° C. and a pressure in the range of from about atmospheric to about 200 atmospheres in contact with a catalyst comprising a crystalline aluminosilicate containing at least one metal from Group VIII of the Periodic Table chemically combined with a metal subfluoride vapor.

Other objects and embodiments referring to alternative aromatic compounds and to alternative catalytic compositions of matter will be found in the following further detailed description of the invention.

The process of my invention is applicable to the hydrogenation of aromatic compounds including, for example, benzene, toluene, ortho-xylene, meta-xylene, para-xylene, ethylbenzene, ortho-ethyltoluene, meta-ethyltoluene, para-ethyltoluene, 1,2,3 - trimethylbenzene, 1,2,4 - trimethylbenzene, 1,3,5 - trimethylbenzene, diethylbenzene, triethylbenzene, normal propylbenzene, isopropylbenzene, etc. and mixtures thereof. Preferred hydrogenatable aromatic compounds are the monocyclic aromatic hydrocarbons, that is, the benzene hydrocarbons. Higher molecular weight alkyl aromatic hydrocarbons are also suitable. These include those aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluene, etc. Very often, alkylate is obtained as a high boiling fraction in which the alkyl group attached to the benzene nucleus varies in size from about $C_9$ to $C_{18}$. Other suitable aromatic hydrocarbons, which at specified conditions, depending upon the melting point of the aromatic chosen, would be in liquid form, would include those aromatic hydrocarbons with two or more aryl groups such as diphenyl, diphenylmethane, triphenylmethane, fluorene, stilbene, etc. Examples of other aromatic hydrocarbons utilizable within the scope of this invention which at specified hydrogenation conditions, depending upon melting point of the aromatic chosen, would be in liquid form, include those containing condensed aromatic rings. These include naphthalene, alkyl naphthalenes, anthracene, phenanthrene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

As hereinbefore set forth, the invention is concerned wih a conversion process for the hydrogenation of aromatic compounds, said process being effected in the presence of a catalyst which possesses a high degree of hydrocarbon conversion activity and is particularly effective as a hydrogenation catalyst for the aromatic compounds hereinabove set forth. The catalyst comprises a crystalline aluminosilicate containing at least one metal from Group VIII of the Periodic Table combined with a metal subfluoride vapor. The crystalline aluminosilicates are composed of $SiO_4$ and $AlO_4$ tetrahedra, a silicon or aluminum atom being centered around four oxygen atoms in the tetrahedra and the oxygen being shared with other surrounding tetrahedra. These aluminosilicates are geometrically arranged to form a pore structure having sufficiently large pore size to permit the reactant molecules to pass into said pore structure. Preferably, the aluminosilicates employed in the catalyst support have pore sizes of from about 4 up to about 15 angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicates to the hydrogen form.

There are numerous types of crystalline aluminosilicates, both synthetic and natural occurring. It is preferable that the pore mouths of the crystalline aluminosilicates have cross-sectional diameters of from about 4 to 15 angstrom units. Among the preferable crystalline aluminosilicates that are suitable are the hydrogen and/or polyvalent forms of faujasite, and mordenite, and especially preferable is the hydrogen form of mordenite. The concentration of crystalline aluminosilicate may be as high as 100% or the crystalline aluminosilicate may be held with a matrix which may be selected from the group consisting of silica, alumina, and silica-alumina mixtures.

As set forth hereinbelow, the catalyst comprises a crystalline aluminosilicate containing at least one metal from Group VIII of the Periodic Table that is combined with a metal subfluoride vapor to effect combination of said crystalline aluminosilicate with the metal subfluoride. Typical metals from Group VIII of the Periodic Table for use in the present invention thus includes iron and the platinum group metals including platinum, palladium, ruthenium, rhodium, osmium and iridium and mixtures thereof. It is preferred that the Group VIII component of my novel catalyst be selected from the group consisting of nickel, platinum, and palladium. The Group VIII component will normally be utilized in an amount of from about 0.01 to about 2.0 percent by weight. Particularly preferred metal subfluorides for use in my invention include the aluminum subfluorides including silicon difluoride due mainly to the relative ease in preparing these compounds, although the invention is not restricted to their use but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

The catalyst of the present invention comprises a crystalline aluminosilicate containing at least one metal from Group VIII of the Periodic Table combined with the metal subfluoride vapor so as to effect combination of said crystalline aluminosilicate with the metal subfluoride vapor and it is the particular association of these components which results in the unusual catalytic properties of this catalyst. The metal subfluoride vapor may be combined with the crystalline aluminosilicate at temperatures in the range of 650° C. to about 1000° C. and at a pressure of from about subatmospheric to about 10 atmospheres. The formation of the metal subfluoride vapor, and especially the formation of aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 850° C. The crystalline aluminosilicate containing at least one metal from Group VIII of the Periodic Table which is then chemically combined with the aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the crystalline aluminosilicates containing at least one metal from Group VIII of the Periodic Table and then heating this support in vacuum in a furnace tube at elevated temperatures.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the aromatic compound is continuously charged to a reaction zone containing a fixed bed of the desired catalyst, said zone being maintained at the proper operating conditions of temperature and pressure, that is, a temperature in the range of from about 10° to about 425° C. or more, and preferably from 50° to about 375° C., and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 3000 or more. The reaction zone may comprise an unpacked vessel or coil or may be lined with an adsorbent packing material. The charge passes through the catalyst bed in an upward, downward, or radial flow and the hydrogenated product is continuously withdrawn, separated from the reactor effluent, and recovered, while any unreacted starting materials may be recycled to form a portion of the feed stock. It is also contemplated within the scope of this invention that gases such as helium, hydrogen, nitrogen, argon, etc., may also be charged to the reaction zone if desired. Another continuous type operation comprises the moving bed type in which the aromatic compound and the catalyst bed move either concurrently or countercurrently to each other while passing through said reaction zone.

Still another type of operation which may be used is the batch type operation in which a quantity of the aromatic compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are introduced for the purpose of illustration only with no intention of unduly limiting the generally broad scope of the present invention.

Example I

A quartz vessel with provisions for connection to a vacuum system is filled with a mixture of about 100 grams of a 5A crystalline aluminosilicate containing about 0.5 weight percent palladium and having a 2:1 silica to alumina mol ratio and about 26 grams of ⅛-inch pellets comprising about 20% aluminum metal and about 80% aluminum trifluoride by weight. The contents of the vessel were outgassed at a pressure of less than $10^{-4}$ mm. while slowly being heated in a tube furnace. Approximately 4½ hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the somewhat greyish catalyst spheres were separated from the pellets and the catalyst was then placed in vessels which were then sealed. This catalyst is designated as catalyst A.

Example II

In this example, a volatile fluoride (800° C.) is prepared by sweeping with helium a stoichiometric mixture of aluminum metal (melting point 660° C.) and aluminum trifluoride (melting point greater than 1000° C.) which is heated to 750–800° C. Aluminum monofluoride is then produced. A catalyst base in the form of hydrogen form faujasite ⅛-inch diameter pills containing about 0.75 weight percent platinum is then placed in the downstream helium flow and the aluminum monofluoride is chemically combined with the base at a temperature in excess of 650° C.

The catalyst produced by this vapor deposition and chemical combination of the aluminum monofluoride with the hydrogen form faujasite containing platinum has fluoride levels of less than 5 percent by weight fluoride chemically combined therewith This catalyst is designated as catalyst B.

Example III

A volatile fluoride (800° C.) is prepared by sweeping with helium a stoichiometric mixture of aluminum metal (melting point 660°C.) and aluminum trifluoride (melting point greater than 1000° C.) which is heated to 750–800° C. Aluminum monofluoride is then produced. A catalyst base in the form of hydrogen form mordenite ⅟₁₆-inch diameter spheres containing about 0.75 weight percent platinum are prepared and placed in the downstream helium flow and the aluminum monofluoride is chemically combined with the base at a temperature in excess of 650° C.

The catalyst produced by this vapor deposition and chemical combination of the aluminum monofluoride with the hydrogen form mordenite containing platinum has fluoride levels of less than 5 weight percent of fluoride chemically combined therewith. This catalyst is designated as catalyst C.

Example IV

The catalyst designated as catalyst A prepared according to Example I above is utilized in a hydrogenation reaction, the finished catalyst being placed in an appropriate continuous hydrogenation apparatus. In the experiment, benzene along with hydrogen is charged to the hydrogenation zone. The reactor was maintained at about 15 p.s.i.g. and 295° C. Substantial conversion of the benzene to cyclohexane and methylcyclopentane is obtained as is evidenced by gas-liquid chromatography.

Example V

The catalyst prepared according to Example II and designated as catalyst B is again utilized in an appropriate continuous hydrogenation apparatus. In the experiment, the finished catalyst is placed in the hydrogenation reaction zonea nd toluene along with hydrogen is charged to said reaction zone. The reactor is maintained at about 100 p.s.i.g. and about 320° C. Substantial conversion of the toluene to methylcyclohexane is obtained as is evidenced by gas-liquid chromatography.

Example VI

The catalyst prepared according to Example III and designated as catalyst C is utilized in the hydrogenation apparatus. In the experiment, the finished catalyst is placed in the hydrogenation reaction zone and ethylbenzene and hydrogen are charged thereto. The reactor is maintained at about 140 p.s.i.g. and about 325° C. Substantial conversion of the ethylbenzene to ethylcyclohexane is obtained as is evidenced by gas-liquid chromatography.

I claim as my invention:

1. A conversion process which comprises hydrogenating an aromatic compound at a temperature in the range of from 10° to about 425° C. and a pressure in the range of from about atmospheric to about 200 atmospheres in contact with a catalyst comprising a crystalline aluminosilicate containnig at least one metal from Group VIII of the Periodic Table and which has been combined with a fluoride selected from the group consisting of aluminum monofluoride vapor and silicon difluoride vapor at a temperature of from about 650° C. to about 1000° C.

2. The process of claim 1 further characterized in that said fluoride is aluminum monofluoride and that said crystalline aluminosilicate contains silica and alumina tetrahedra having uniform pores of between 4 and 15 angstroms.

3. The process of claim 2 further characterized in that said silica and alumina tetrahedra having uniform pores of between 4 and 15 angstroms are suspended in an alumina matrix.

4. The process of claim 2 further characterized in that said silica and alumina tetrahedra having uniform pores of between 4 and 15 angstroms are suspended in a silica matrix.

5. The process of claim 2 further characterized in that said silica and alumina tetrahedra having uniform pores of between 4 and 15 angstroms are suspended in a silica-alumina matrix.

6. The process of claim 2 further characterized in that said crystalline aluminosilicate is the hydrogen form of faujasite and the Group VIII metal is selected from the group consisting of nickel, platinum and palladium.

7. The process of claim 2 further characterized in that said crystalline aluminosilicate is the hydrogen form of mordenite and the Group VIII metal is selected from the group consisting of nickel, platinum and palladium.

8. The process of claim 2 further characterized in that said aromatic compound is a benzene hydrocarbon.

9. The process of claim 8 further characterized in that said benzene hydrocarbon is benzene.

10. The process of claim 8 further characterized in that said benzene hydrocarbon is ethylbenzene.

References Cited

UNITED STATES PATENTS

| | | | |
|---|---|---|---|
| 2,958,644 | 11/1960 | Kimberlin et al. | 260—676 |
| 2,971,904 | 2/1961 | Gladrow | 260—676 |
| 3,140,322 | 7/1964 | Frilette | 260—667 |
| 3,140,253 | 7/1964 | Plank | 208—120 |

DELBERT E. GANTZ, *Primary Examiner.*

V. O'KEEFE, *Assistant Examiner.*